Figure 1:
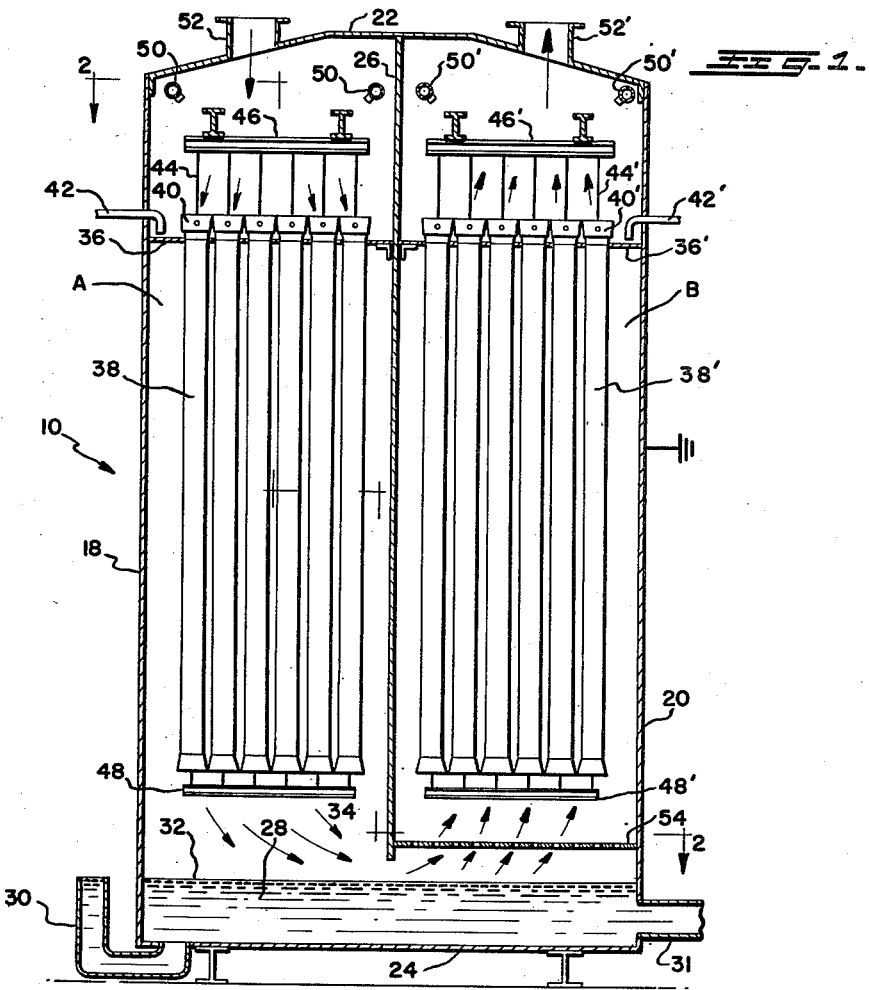

Nov. 26, 1957 C. E. BEAVER 2,814,360
METHOD OF ELECTRICAL PRECIPITATION
Filed Dec. 12, 1955

INVENTOR
CHARLES E. BEAVER
BY Harold T. Stowell
ATTORNEY

2,814,360

METHOD OF ELECTRICAL PRECIPITATION

Charles E. Beaver, Bound Brook, N. J., assignor to Research Corporation, New York, N. Y., a corporation of New York Application December 12, 1955, Serial No. 552,324

2 Claims. (Cl. 183—119)

This invention relates to new and improved methods for the separation and collection of values suspended in gas streams.

More particularly, the invention relates to a method for recovering values from flue gases issuing from furnaces burning black liquor in a sulfate process paper mill.

It is a primary object of the present invention to provide methods for conveniently and economically collecting dust from a stream of hot gases containing suspended particulate matter in a form of concentrated liquor solution.

It is a further object of the invention to provide improved method for collecting, catching and suspending particulate material such as sulfate salt cake in a slurry form.

It is a further object of the present invention to provide an improved method which is carried out in an apparatus that is relatively simple and relatively inexpensive to manufacture and which performs two basic functions, namely, evaporation of water from the black liquor by means of the hot gas passing over same together with the precipitation of solids into said black liquor, thereby increasing concentration of the black liquor.

The foregoing and other objects and advantages are provided by the present invention which generally comprises a method of recovering values from sulfate pulp digestion liquors comprising passing a stream of hot gases having suspended fume from furnaces burning black liquor through a treating zone, progressively conditioning and cooling the gases while in the zone by continuously flushing the boundaries of the treating zone with a liquor containing soluble portions from sulfate digestion whereby the concentration of the liquor is substantially increased, and further progressively increasing the concentration of the liquor in the treating zone by subjecting the gases to electrostatic precipitation therein; and which utilizes an apparatus for recovering such values which generally comprises a first electrostatic precipitator including a plurality of vertically extending extended surface collecting electrodes and complementary discharge electrodes, dirty gas inlet means positioned above the upper ends of the electrodes, means establishing a flow of flushing liquid in contact with the collecting surface of the extended surface electrodes, a second electrostatic precipitator comprising a plurality of vertically extending extended surface electrodes and complementary discharge electrodes, clean gas outlet means above the upper ends of the electrodes in the second precipitator, means establishing a flow of flushing liquid in contact with the collecting surface of the extended surface electrodes in the second precipitator, a pool of liquor positioned below the lower ends of the electrodes in both the first and second precipitators, the upper surface of said pool of liquid forming one boundary of a gas passage connecting the lower ends of the electrodes in the first and second electrostatic precipitators.

Figure 2:
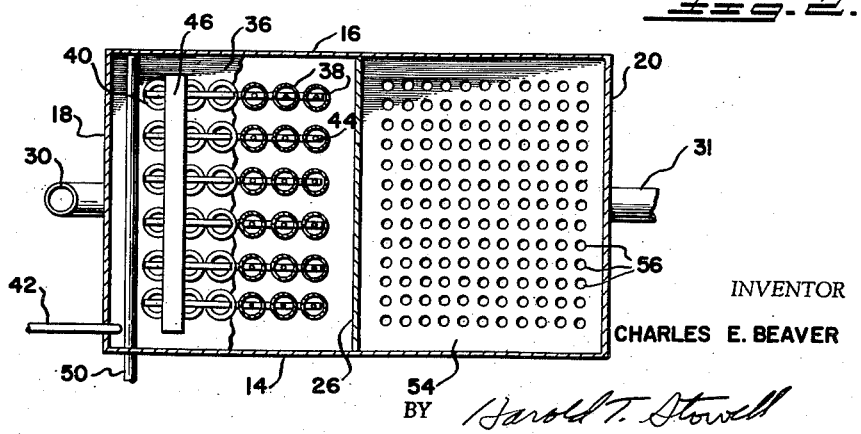

The invention will be more particularly described with reference to the illustrated embodiments of the invention shown in the accompanying drawings in which:

Fig. 1 is a vertical sectional view of an electrostatic precipitator embodying the principles of the present invention; and Fig. 2 is a section substantially on line 2—2 of Fig. 1.

Black liquor is obtained in the sulfate pulp process from the pulp digestors after separation from the digested wood or lignocellulose material. The weak black liquor contains many valuable chemicals, including sodium sulfate, and considerable dissolved organic material. In the recovery system described, for example, in U. S. Patent 2,646,132, the black liquor is reduced to a concentration at which it will ignite and it is thereafter burned in a furnace to oxidize and volatilize the organic material and water and to reduce the sodium sulfate to sodium sulfide. The sodium sulfide is recovered from the furnace ash and, after purification, is generally re-used in the digestion of further quantities of wood chips.

Generally the first step of concentration of the weak black liquor is performed in a conventional evaporator from which the more concentrated black liquor is conducted to an electrical precipitator wherein further concentration is affected. When the black liquor reaches the concentration at which it will ignite, it is fed into a suitable furnace and the fume issuing therefrom is conducted to the electrostatic precipitator wherein the suspended particulate material is separated and added to the concentrated black liquor.

The present invention deals with apparatus for fortifying the concentrated black liquor and separating the suspended particulate materials from the gas stream issuing from the stacks of black liquor ignition furnaces.

Referring to the drawings, the apparatus of the present invention includes a casing or housing 10 having sides 14 and 16, end walls 18 and 20, top 22 and a bottom 24. Extending centrally through the housing 10 is a vertically extending partition member 26 which is secured to the top 22 and along the lateral edges to the sides 14 and 16.

The partition 26 terminates above the bottom 24 which bottom is adapted to receive and maintain a pool or pond of black liquor 28. The depth of the pool of black liquor is maintained at a substantially constant level by the overflow conduit 30 or other suitable volume control means as is well known in the art, so that a passage of substantially uniform height is maintained between the top 32 of the pool of liquor and the lower edge 34 of the partition member 26.

From the drawings it will be seen that the partition member divides the housing 10 into two sections designated A and B.

Section A is provided with a horizontal header sheet 36 having a plurality of openings therethrough into which a plurality of extended surface collecting electrodes, such as pipe electrodes 38 extend.

It will be understood, however, that plate type electrodes may also be advantageously used in the apparatus of the present invention.

The upper ends of the collecting electrodes 38 are provided with weir members 40 so that the tops thereof may be readily levelled. A conduit 42 connected to a source of weak black liquor directs a stream thereof to the upper surface of header sheet 36 to provide a pool of flushing liquid for the plurality of collecting electrodes 38.

The lower ends of the electrodes 38 terminate above the upper surface of the pool 32 and above the lower edge 34 of the partition member 26. Each of the tubular collecting electrodes is provided with a complementary discharge electrode 44 which is suspended from bus bars 46 connected to a source of high voltage electricity not shown in the drawings. The lower ends of the discharge electrodes 44 are provided with a steadying frame 48 as is well known in the art. Above the framework suspending the discharge electrodes are provided a plurality of liquid spray devices 50 for directing weak black liquor against the discharge electrodes, and an inlet 52 for dirty gases containing suspended particulate material issuing from furnaces burning black liquor.

Section B of the housing 10 is provided with collecting electrodes 38' and discharge electrodes 44' substantially identical in form and number with the electrodes in section A. Like the electrodes in Section A electrodes 38' are supported in a header sheet 36' provided with a conduit 42' for directing weak black liquor to the upper surface of the header sheet 36' to provide a pool of flushing liquid for the tubular electrodes 38'.

The discharge electrodes 44' are suspended from bus bar 46' and are provided with liquid spray means 50' connected to a source of weak black liquor. The lower ends of the discharge electrodes 44' are secured to a steadying frame 48'.

Below the lower ends of the discharge electrodes 44' there is provided a horizontal plate 54, which plate is secured about its edges to the sides 14 and 16, the end wall 20, and to the partition member 26. The plate 54 as more clearly shown in Fig. 2 is provided with a plurality of openings 56 therethrough.

The perforated plate 54 provides means for insuring intimate mixture between the gas stream being cleaned and the black liquor flowing from the ends of the plurality of collecting and discharge electrodes 38' and 44' whereby very effective washing, humidifying and cooling of the gas at this point is obtained. The employment of the perforated gas distributing plate 54 below the electrodes of section B also permits the use of a shallow hopper construction under the electrodes.

From the following description of the operation of the apparatus of the present invention, it will be seen that while the use of perforated plate type gas distributing means with fume type gases have heretofore been entirely unsatisfactory due to buildup of desposits of suspended materials on the plates which decreases the passage of the gases therethrough causing poor gas distribution, the perforate gas distributing plate 54 of the present apparatus is maintained, clean and free of deposits by the uniformly distributed discharge of black liquor from the ends of the collecting and discharge electrodes 38' and 44' positioned vertically thereabove.

In operation of the gas cleaning system of the present invention black liquor from a source of black liquor is directed into the pool 28 through conduit 31 connected to a source of black liquor. Black liquor is also directed to the sprays 50 and 50' and to the conduits 42 and 42' to provide flushing liquid for the plurality of electrodes 38 and 38' and 44 and 44'. Gas containing suspended particulate material issuing from furnaces burning black liquor is conveyed to the inlet 52 of section A of the gas cleaning device. The gas stream passes downwardly through the collecting pipes 38 wherein the hot gases are cooled by evaporation of water from the black liquor flowing down the inside of the pipes; the suspended material in the gas stream is precipitated and collected in the flushing black liquor; gases containing sulfur and sulfur compounds are absorbed into the flushing liquor; the flushing liquor is concentrated by picking up the precipitated solid particles; and the gas stream is conditioned by the evaporation of water from the flushing liquor. After the gases have passed through the pipe type electrodes 38 the gases flow, as shown by the directional arrows, across the face of the pool of liquor 28 and up through perforate gas distributing plate 54 while the black liquor, which has been concentrated while flowing downwardly through the tubes 38 is collected at the discharge end of the pool 28.

The partially conditioned and partially cleaned gas stream, as it passes through the flushed openings 56 in the perforated baffle 54, is intimately mixed with the black liquor dripping from the electrodes of section B to effect further washing, humidifying, and cooling of the gas stream, and concentration of the black liquor.

As the gas stream passes upwardly through the collecting pipe electrodes 38' there will be further simultaneous and progressive treatment thereof including evaporation of water; concentration of the black liquor; conditioning of the gas and fume particles; and electrostatic precipitation of the fume particles directly into the flushing black liquor.

The gases, free of suspended particulate material, issue from the outlet 52' above the electrodes in section B. Throughout the gas cleaning process fresh weak black liquor enters the pool 28 through the conduit 31 and the concentrated black liquor is withdrawn therefrom through conduit 30.

The principles of operation and advantages of the invention will be further evident from the following specific example:

Mill data:
   Size of paper mill—300-ton plant.
   Gas volume to be treated—194,000 C. F. M.
   Gas temperature at inlet—600° F.
   Approximate solid content of gas—5 grains per cubic foot dry at standard conditions of 32° F. and 29.92" Hg.
   Black liquor available—12,000 gals./per hour.
   Solids concentration of black liquor—4.55 pounds per gallon.
Electrical precipitator data:
   Number of pipe type collecting electrodes in each of the two sections—400.
   Diameter of pipes—12 inches.
   Length of pipes—15 feet.
   Total surface area available for collecting suspended material and concentrating black liquor—37,500 square feet.
Operating data:
   Gallons of black liquor supplied to each pipe—1 G. P. M.
   Black liquor at 4.55 pounds solids per gallon available from mill—.25 G. P. M. per pipe.
   Amount of black liquor recirculated through pipes—.75 G. P. M. per pipe.
   Outlet temperature of gases—about 300° F.
   Concentration of black liquor after passing through precipitator—5 pounds per gallon.

From the foregoing description, it will be seen that the present invention fully accomplishes the hereinabove described objects and advantages.

I claim:

1. A method of recovering values from sulfate pulp digestion liquors comprising passing a stream of hot gases having suspended fume from furnaces burning black liquor downwardly through a treating zone, progressively conditioning and cooling the gases while in said zone by continuously flushing the boundaries of the treating zone with a liquor containing soluble portions from sulfate digestion whereby the concentration of the liquor is substantially increased, reversing the flow of the gas stream, dividing the flow of the gas stream into multiple parts, passing the gas stream having a portion of the suspended fume removed therefrom upwardly through a second treating zone, progressively conditioning and cooling the gases while in said last named zone by continuously flushing the boundaries of the last named treating zone with a liquor containing soluble portions from sulfate digestion, and further progressively increasing the concentration of the liquor in said treating zones by subjecting the gases to electrostatic precipitation therein.

2. The method defined in claim 1 including the step of intimately mixing the divided gas stream entering the second treating zone with black liquor employed in continuously flushing the boundaries of the second treating zone.

References Cited in the file of this patent

UNITED STATES PATENTS

| | | |
|---|---|---|
| 1,250,088 | Burns | Dec. 11, 1917 |
| 1,382,037 | Welch | June 21, 1921 |
| 2,555,216 | Wintermute | May 29, 1951 |
| 2,689,019 | Roberts et al. | Sept. 14, 1954 |
| 2,709,497 | Phyl | May 31, 1955 |

FOREIGN PATENTS

| | | |
|---|---|---|
| 346,635 | Great Britain | Apr. 16, 1931 |
| 652,855 | France | Oct. 29, 1928 |